(12) United States Patent
Pfister

(10) Patent No.: US 7,532,770 B2
(45) Date of Patent: May 12, 2009

(54) METHOD FOR COMBINING TWO IMAGES BASED ON ELIMINATING BACKGROUND PIXELS FROM ONE OF THE IMAGES

(75) Inventor: Marcus Pfister, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 778 days.

(21) Appl. No.: 11/234,684

(22) Filed: Sep. 23, 2005

(65) Prior Publication Data

US 2007/0071341 A1    Mar. 29, 2007

(51) Int. Cl.
*G06K 9/36* (2006.01)
*G06K 9/40* (2006.01)
*G09G 5/02* (2006.01)
*G06K 9/00* (2006.01)

(52) U.S. Cl. .................. 382/284; 382/254; 345/640
(58) Field of Classification Search .......... 382/254, 382/270, 282, 284, 294, 128, 173; 345/589, 345/592, 629, 634, 639, 640
See application file for complete search history.

(56) References Cited

U.S. PATENT DOCUMENTS

| | | | | |
|---|---|---|---|---|
| 6,903,738 B2 * | 6/2005 | Pfister et al. | ............... | 345/420 |
| 7,034,850 B2 * | 4/2006 | Tezuka et al. | ............... | 345/640 |
| 7,437,013 B2 * | 10/2008 | Anderson | ............... | 382/261 |
| 2007/0103483 A1 * | 5/2007 | Glen | ............... | 345/592 |

OTHER PUBLICATIONS

"Using a Color Matrix to Set Alpha Values in Images", http://msdn.microsoft.com/library/default.asp?url=/library/...linesandfills/usingacolormatrixtosetalphavaluesinimages.asp, Microsoft Developer's Network. Printout Jun. 20, 2005. Publication date unknown, author unknown.
"Setting the Alpha Values of Individual Pixels", http://masn.microsoft.com/library/default.asp?url=/library/e...inglinesandfills/settingthealphavaluesofindiivdualpixels.asp, Microsoft Developer's Network. Printout Jun. 20, 2005. Publication date unknown, author unknown.
Definition of "alpha channel" from Webopedia (http://www.webopedia.com/TERM/A/alpha_channel.html). Printout Jun. 20, 2005. Publication date unknown, author unknown.

* cited by examiner

*Primary Examiner*—Yon Couso
(74) *Attorney, Agent, or Firm*—Schiff Hardin LLP

(57) ABSTRACT

Two or more images are combined by designating one image as a threshold image based on information within the images themselves. Pixels in this threshold image are then segregating into foreground and background pixels according to some criteria. An alpha value is set to zero for background pixels indicating that these pixels in the threshold image will make no contribution in the combined image. The foreground pixels of the threshold image are set to some value greater than zero. Alpha values in the non-threshold image(s) are set such that the total value of alphas for pixels in the images to be combined totals one (indicating 100% total contribution).

11 Claims, 3 Drawing Sheets

| 0 (BG) | 0 (BG) | 0 (BG) | α (FG) | 0 (BG) | 0 (BG) |
|---|---|---|---|---|---|
| 0 (BG) | 0 (BG) | α (FG) | 0 (BG) | 0 (BG) | 0 (BG) |
| 0 (BG) | α (FG) | α (FG) | 0 (BG) | 0 (BG) | 0 (BG) |
| 0 (BG) | 0 (BG) | α (FG) | α (FG) | 0 (BG) | 0 (BG) |
| 0 (BG) | 0 (BG) | 0 (BG) | α (FG) | 0 (BG) | 0 (BG) |

Image 1

$+$

| 1 | 1 | 1 | $1-\alpha$ | 1 | 1 |
|---|---|---|---|---|---|
| 1 | 1 | $1-\alpha$ | 1 | 1 | 1 |
| 1 | $1-\alpha$ | $1-\alpha$ | 1 | 1 | 1 |
| 1 | 1 | $1-\alpha$ | $1-\alpha$ | 1 | 1 |
| 1 | 1 | 1 | $1-\alpha$ | 1 | 1 |

Image 2

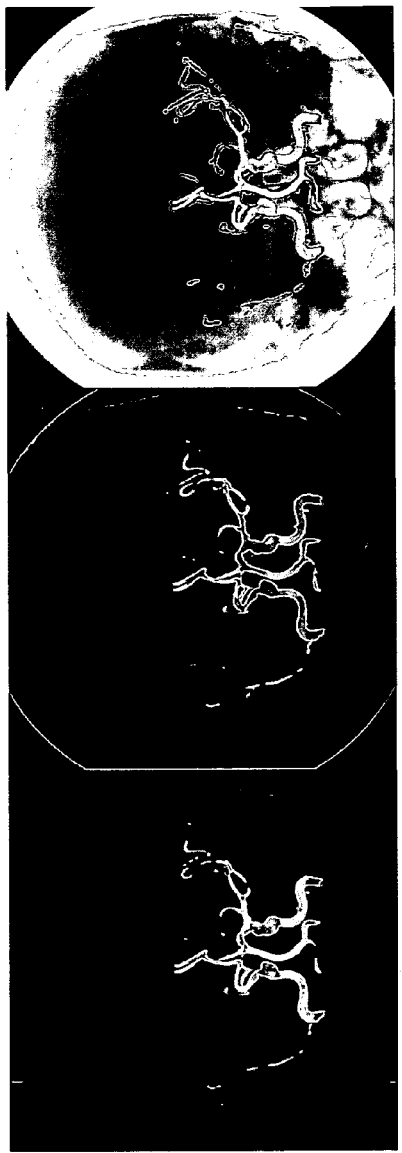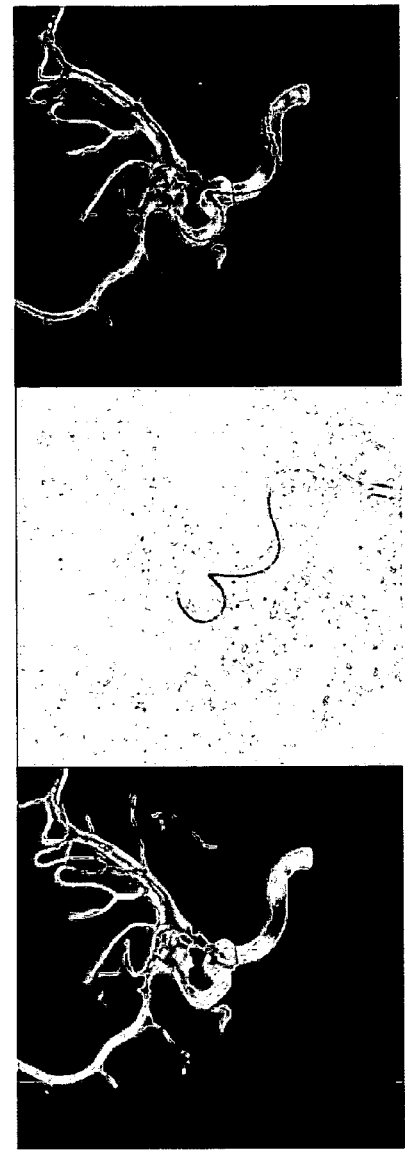

METHOD FOR COMBINING TWO IMAGES BASED ON ELIMINATING BACKGROUND PIXELS FROM ONE OF THE IMAGES

BACKGROUND

The invention relates to the combining of multiple images to produce combined images having superior quality.

In image processing systems, an image is often represented by a matrix of values in which each matrix value corresponds in some way to a position within a dimension (spatial, time, parameter, etc.) of the image that corresponds to the imaging subject. In two dimensional systems, the matrix element is known as a pixel; and in three-dimensional systems, the matrix element is known as a voxel (short for volume pixel). Any number of dimensions may be utilized in the imaging.

By way of a concrete example, in two dimensional imaging, it is common to represent images with pixels having 32-bit values. Such systems utilize four 8-bit channels, with each 8-bit channel able to accommodate a value between 0 and 255. The first three channels are associated with a color value, and may correspond with primary colors red, green and blue respectively. The last 8-bit channel, the alpha channel containing an alpha value, is really a mask and specifies how a pixel's colors should be merged with another pixel when two pixels are overlaid on top of one another. Nothing inherently limits the number of bits that can be allocated to a pixel.

In medical imaging, the process of image registration and fusion has become a common approach to align images from different modalities (or 2D and 3D images from the same or different modality) to bring additional information into a corresponding modality. A well-known approach is the fusion of positron emission tomography (PET) or single photon emission-computed tomography (SPECT) images (capable of showing tumor information, but little else) with computed tomography (CT) (capable of showing detailed anatomy).

Another approach, which has gained attention is the 2D3D registration, i.e., the registration of pre- or intra-operative 3D volume data to intraoperatively acquired fluoroscopic or angioscopic images. The known way to present these registered images is to blend them, i.e., to present an image where each pixel consists of a weighted sum of the corresponding pixels in each image (FIG. 1). In this known application, the same alpha value is used for the entire image.

One problem with this arrangement is that one of the images usually contains a lot of background pixels carrying no information. For example, in a 3D angioscopic image, only the vessels are of interest; in a PET image only the "hot spot" is of interest. By using the same value for each pixel (FIG. 1), these background pixels problematically reduce the contrast of the other image. This is an undesirable approach, especially for 2D3D registration where the 2D fluoroscopic image has little contrast to begin with.

According to the description below, the value of alpha ranges from zero to one that indicates a proportion of contribution of the image pixel for a particular image to an appertaining pixel in the combined image (the actual numbers used could be based on the number of bits available—e.g., for an 8-bit alpha channel, "0" (no contribution) could be represented by the integer 0, and "1" (full contribution) could be represented by the integer 255). For the images used in the combined images, the alpha values of the respective pixels should total one for a 100% total contribution. This is true regardless of the number of images to be combined, although for the sake of simplicity, only an embodiment with two images to be combined is described in detail.

Global Alpha Value

FIG. 1 illustrates the usual alpha blending in which one global (adjustable) alpha value is used for blending. Each pixel of Image 1 is weighted with a value $\alpha$, as are all of the (e.g., white) background pixels containing no information. Each pixel of Image 2 is weighted with a value of $(1-\alpha)$, so in the blended image, those pixels of Image 2 containing information but corresponding to background pixels (the gray ones) are unnecessarily reduced in contrast.

Non-Threshold Based Alphas

It is known to provide an object-based use of alpha values for rendering overlapping objects in drawing programs—however, these objects user-created and are not determined from information obtained from the image itself. Similarly, the setting of alpha values of individual pixels is known, but no basis exists from setting these alpha values based on information obtained from the image.

SUMMARY OF THE INVENTION

The invention addresses the problem by selecting an image as a threshold image, introducing a threshold into this threshold image, and blending only the foreground pixels with corresponding pixels of the non-threshold image(s) based on the determined threshold.

Inventively, an individual alpha for each pixel, not a global alpha, is used that is based on a determined threshold, and this threshold is determined based on information within one of the images that is chosen as the threshold image, which may be e.g., generally the one with the highest contrast and/or the one containing the most background pixels, but this may also depend on the application. Know techniques may be utilized for making the threshold determinations.

An example is given for the fusion of two images, although, in principle, more than two images can be merged. The invention encompasses any way by which the threshold image is determined as well as the criteria for designating a pixel within this threshold image as being a foreground or background pixel, and encompasses embodiments in which the threshold is based on the threshold image information itself or its histogram (i.e., a percentage of pixels below a particular luminosity value), or is computed on a preprocessed image (e.g., using edge detection, where boundaries of the preprocessed image maybe utilized to segregate corresponding pixels in the threshold image, etc.). There can be also multiple thresholds or a "soft" threshold (such as a ramp function). Although one specific function of the individual alphas is described below, in principle, any function of the individual alphas based on the threshold information can be used.

Multiple images may be used as well. In one such embodiment, one of the images is still selected as the threshold image, and the corresponding threshold alpha values are applied to this image. However, the remaining image contributions must still total one, and therefore the alpha values for the non-threshold images may be evenly divided between corresponding pixels of these images.

Alternately, multiple images may be processed in an iterative manner, in which the first two images are operated upon, and upon completion of one iteration, the combined image becomes the first image of the next iteration, and a new images is utilized as the second.

DESCRIPTION OF THE DRAWINGS

FIG. 1 is a graphic representation showing the known global alpha blending technique;

FIG. 2 is a graphic representation according to an embodiment of the invention;

FIGS. 3A-C are image files illustrating a 2D3D registration; and

FIGS. 4A-C are image files illustrating a 2D3D registration as 3D roadmapping.

DETAILED DESCRIPTION OF THE PREFERRED EMBODIMENTS

Figure 2:
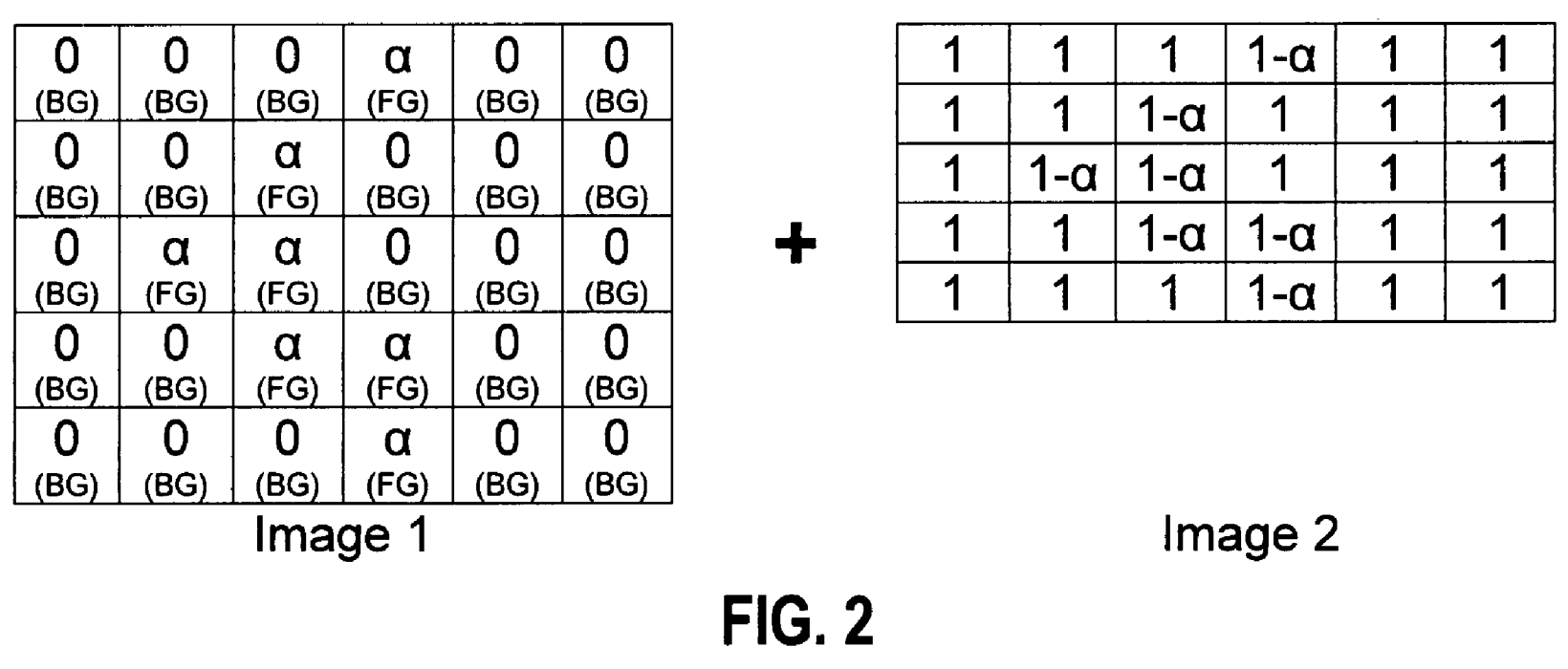

FIG. 2 illustrates a threshold based alpha blending. In this case, the alpha values are set for each pixel independently. A threshold image is determined according to some threshold image designation criteria. For example, this maybe determined as the image containing the most background pixels (as noted previously, this may also depend on the application) dividing the foreground from the background. Here, Image 1 is selected as the threshold image to be divided between foreground and background pixels.

In the threshold image, the alpha value for pixels below the threshold (the background) are set to zero, and the respective alpha values corresponding pixels in Image 2 (non-threshold image) are set to one, indicating that these background pixels of Image 1 make no contribution to the combined image. The alpha for those pixels of Image 1 containing foreground information are set to a value $\alpha$, and the corresponding pixels in Image 2 are set to $(1-\alpha)$ so that the total contribution of the respective pixels totals one. This ensures that the background pixels of Image 1 do not spoil the contrast for the corresponding pixels in Image 2 (the grey pixels). The actual value of $\alpha$ can be adjusted, meaning that the portion of contribution for Image 1 and Image 2, can be optimally set.

As illustrated by FIG. 2, a threshold function divides the threshold image into foreground (FG) and background (BG) pixels, e.g., in Image 1, according to the pixel matrix. This segregation can occur according to a manually selected pixel luminosity value, or it can be determined based on a histogram and based on a predetermined percentage of pixels that must lie below the threshold. It can be seen in FIG. 2 that for the BG pixels in Image 1, all of the alpha values are set to zero so they will not contribute to the resulting blended image. For the corresponding pixels in Image 2 (i.e., those having the same coordinates as the BG pixels of Image 1), the alpha values are set to one so they fully contribute to the resulting image, when combined. The resultant blended/combined image is the sum of the two individually weighted images.

As noted previously, the thresholding does not have to reflect a binary thresholding between the background BG and foreground FG pixels, but rather can take on a form of a ramp function or other function that would provide for a gradual transition. Accordingly, the alpha values in Image 1 (threshold image) of FIG. 2 would be set to zero for the background BG, $\alpha$ for the foreground FG and some value in between for those pixels on the boundary regions of the background BG and foreground FG. These boundary conditions may be determined by e.g., edge detection routines. Accordingly, the alpha values for these boundary region pixels would be adjusted in Image 2 such that the Image 1 and Image 2 alpha values total one.

The combined image is output to an output device that could be a display monitor, printer, data storage device or any other hardware for displaying or storing the combined image.

Figure 1:
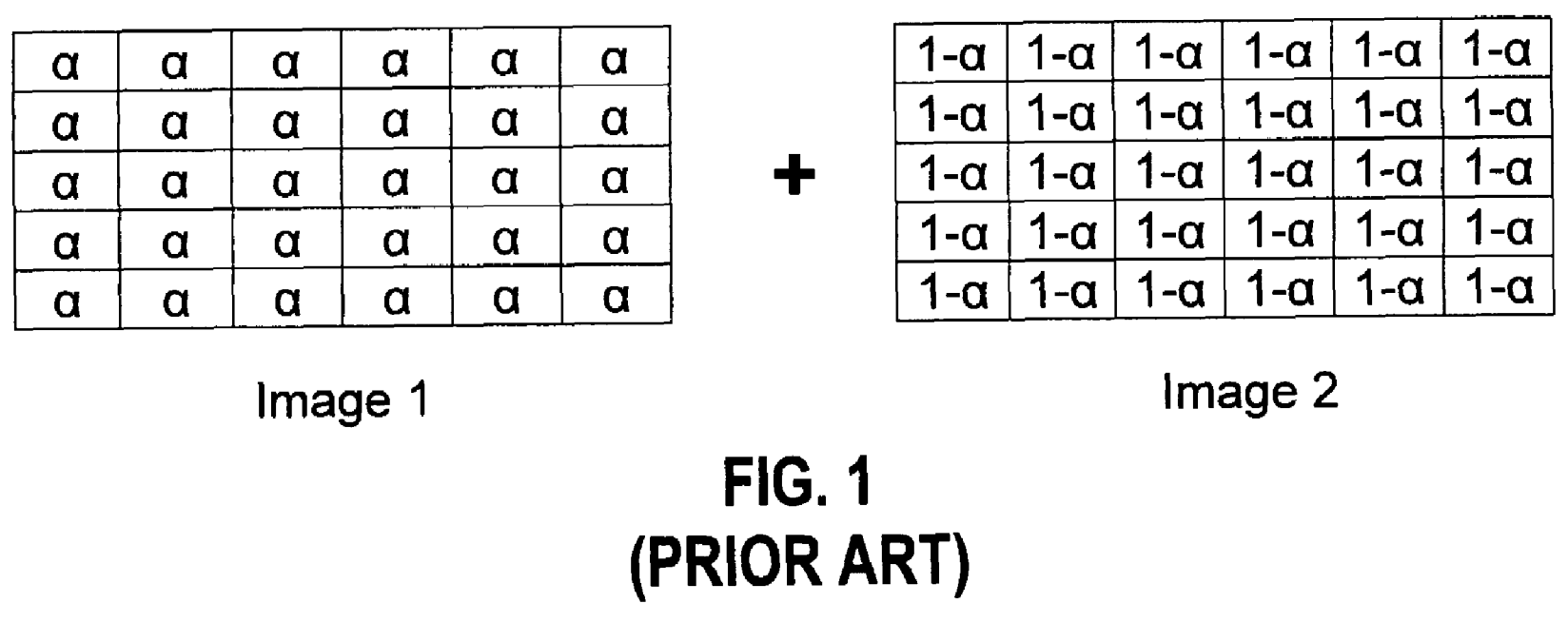

FIGS. 3A-C and 4A-C illustrate examples for different applications in which the result and benefit can clearly be seen. FIGS. 3A-C illustrate an example for a 2D3D registration (i.e., for combined 2D and 3D images). FIG. 3A shows an image containing the most background pixels (in this case, the 3D image), which is likened to Image 1 in FIG. 1. FIG. 3B shows a resulting image using conventional alpha blending with a fluoroscopic image, as would result from the known blending techniques as illustrated by FIG. 1. FIG. 3C shows a resulting image using the threshold-based alpha blending that does not take the background pixels of the Image 1 (threshold image) into account, as would result from the known blending techniques as illustrated by FIG. 2. The effect is clearly seen—substantially more detail can be made out in the image of FIG. 3C, as opposed to the image of FIG. 3B.

FIGS. 4A-C illustrate an example for 2D3D registration, according to a 3D Roadmapping In conventional 2D roadmapping, known from neuroradiological procedures, a contrasted vessel image is subtracted from the live images to get rid of bony structures in the images and simultaneously overlay the catheter with an image of the vessel tree. In 3D Roadmapping, this 2D vessel image (the "roadmap" is replaced by a coregistered 3D vessel tree (i.e., a reconstructed 3D Angio, a CTA or an MRA) on which the subtracted catheter (i.e., the catheter without the bony background) is projected.

FIG. 4A (Image 1) shows a 3D image of blood vessels. FIG. 4B shows a 2D image (Image 2) of a catheter (e.g., a subtracted fluoroscopic image) that contains even more background pixels than Image 1. FIG. 4C illustrates a combined image utilizing a threshold based alpha blending. In this case, the background pixels of Image 2 (threshold image) are not taken into account (otherwise, they would tend to significant lighten the image and reduce its contrast), so that only a catheter of Image 2 is blended onto Image 1 (non-threshold image), and the shaded structure of Image 1 is not blurred or contrast reduced and can still clearly seen.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. As used herein, the term "pixel" is broadly defined as any unit of representation for an image, regardless of size, dimensions, etc.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method for combining two images into a combined image, comprising:
   acquiring a first image comprising pixels with a computer system;
   acquiring a second image comprising pixels with the computer system;
   designating either the first or the second image as being a threshold image, and the other as being a non-threshold image, based on a predetermined designation criteria;
   segregating pixels in the threshold image into foreground pixels and background pixels according to a predetermined threshold criteria;
   applying an alpha value representing a degree of contribution for a merged image to each pixel of the threshold image, wherein a respective pixel alpha value represents a zero degree of contribution for the background pixels, and greater than zero degree of contribution for the foreground pixels;
   applying an alpha value representing a degree of contribution for a merged image to each pixel of the non-threshold image, wherein the alpha value for each pixel of the non-threshold image is chosen to represent a full degree of contribution minus the alpha value of a corresponding pixel in the threshold image;
   combining respective pixels in the threshold image with pixels in the non-threshold image to produce a combined image, the relative contribution of a threshold image pixel and non-threshold image pixel being defined by the appertaining alpha values of the pixels; and
   outputting the combined image via an output device.

2. The method for combining two images according to claim 1, wherein
   the alpha value representing a zero degree of contribution is 0; and
   the alpha value representing a full degree of contribution is 1.

3. The method according to claim 1, wherein the predetermined designation criteria comprises:
   performing a contrast analysis on the first and second images to determine which image has greater contrast; and
   selecting the image having the greater contrast as the threshold image.

4. The method according to claim 1, wherein the predetermined designation criteria comprises:
   segregating pixels in the first image into foreground pixels and background pixels according to some predetermined threshold criteria;
   segregating pixels in the second image into foreground pixels and background pixels according to some predetermined threshold criteria;
   selecting the image having a larger number of background pixels as the threshold image.

5. The method according to claim 1, wherein the predetermined threshold criteria comprises:
   manually selecting a pixel luminosity value as defining a threshold;
   designating pixels below the threshold in the threshold image as being the background pixels; and
   designating pixels above the threshold in the threshold image as being foreground pixels.

6. The method according to claim 1, wherein the predetermined threshold criteria comprises:
   calculating a histogram for the threshold image;
   determining a threshold at which a predetermined percentage of pixels in the threshold image lie below the threshold;
   designating pixels below the threshold as being the background pixels; and
   designating pixels above the threshold as being foreground pixels.

7. The method according to claim 1, further comprising:
   creating a preprocessed image based on the threshold image according to a preprocessing algorithm;
   manually selecting a pixel luminosity value as defining a threshold;
   designating pixels in the threshold image corresponding to pixels below the threshold in the preprocessed image as being the background pixels; and
   designating pixels in the threshold image corresponding to pixels above the threshold in the preprocessed image as being the foreground pixels.

8. The method according to claim 1, further comprising:
   creating a preprocessed image comprising edge boundaries based on the threshold image according to a preprocessing edge-detection algorithm;
   utilizing the boundaries of the preprocessed image to segregate pixels in the threshold image corresponding to pixels in the preprocessed image between the background pixels and the foreground pixels.

9. The method according to claim 1, further comprising:
   creating a preprocessed image comprising edge boundaries based on the threshold image according to a preprocessing edge detection algorithm;
   applying an alpha value to pixels in the threshold image corresponding to edge boundary pixels in the preprocessed image that is an intermediate value between that used for the background pixels of the threshold image and that used for the foreground pixels of the threshold image.

10. The method according to claim 1, further comprising:
    acquiring additional images comprising pixels with the computer system;
    designating either the first, the second or one of the additional images as being the threshold image, and the others as being non-threshold images, based on the predetermined designation criteria; and
    applying an alpha value representing a degree of contribution for a merged image to each pixel of each non-threshold image, wherein the alpha value for each pixel of each non-threshold image is chosen to represent a full degree of contribution minus the alpha value of a corresponding pixel in the threshold image divided by the number of non-threshold images present.

11. The method according to claim 1, further comprising:
    acquiring additional images comprising pixels with the computer system; and
    iteratively applying the steps of claim 1, and, upon completion of these steps, replacing the first image of a new iteration with the combined image of the prior iteration before acquiring each additional image.

* * * * *